United States Patent [19]

Miyake et al.

[11] Patent Number: 4,905,786

[45] Date of Patent: Mar. 6, 1990

[54] VEHICLE SPEED CONTROL SYSTEM FOR MOTOR VEHICLE HAVING AN AUTOMATIC TRANSMISSION CONTROL SYSTEM

[75] Inventors: Osamu Miyake, Miyoshi; Nobuyasu Suzumura, Toyota; Shoji Kawata, Okazaki, all of Japan

[73] Assignee: Aisin Seiki Kabushiki Kaisha, Kariya, Japan

[21] Appl. No.: 86,450

[22] Filed: Aug. 18, 1987

[30] Foreign Application Priority Data

Aug. 19, 1986 [JP] Japan ................. 61-193840
Aug. 19, 1986 [JP] Japan ................. 61-193842
Aug. 19, 1986 [JP] Japan ................. 61-193843
Aug. 19, 1986 [JP] Japan ................. 61-193844
Aug. 19, 1986 [JP] Japan ................. 61-193845
Aug. 19, 1986 [JP] Japan ................. 61-193846
Aug. 19, 1986 [JP] Japan ................. 61-193847
Aug. 19, 1986 [JP] Japan ................. 61-193848

[51] Int. Cl.[4] ........................................ B60K 31/04
[52] U.S. Cl. ........................... 180/179; 180/176; 364/424.1; 364/426.04; 74/860; 74/866
[58] Field of Search ............... 180/176, 178, 179; 74/859, 860, 866, 752 A; 364/424.1, 426.04, 431.07, 424.01

[56] References Cited

U.S. PATENT DOCUMENTS

| | | | |
|---|---|---|---|
| 4,027,554 | 6/1977 | Ito et al. | 74/866 |
| 4,157,124 | 6/1979 | Poore | 180/178 |
| 4,408,293 | 10/1983 | Avins | 180/179 |
| 4,421,192 | 12/1983 | Ito et al. | 180/179 |
| 4,506,752 | 3/1985 | Hara et al. | 74/866 |
| 4,516,652 | 5/1985 | Tanigawa et al. | 74/866 |
| 4,560,024 | 12/1985 | Noda et al. | 180/176 |
| 4,660,672 | 4/1987 | Katou | 180/178 |
| 4,698,762 | 10/1987 | Moriya et al. | 364/426 |

FOREIGN PATENT DOCUMENTS 0142044 5/1985 European Pat. Off. .
0142046 5/1985 European Pat. Off. .

Primary Examiner—Charles A. Marmor
Assistant Examiner—Brian Johnson
Attorney, Agent, or Firm—Sughrue, Mion, Zinn, Macpeak & Seas

[57] ABSTRACT

A vehicle speed control system for a motor vehicle having an automatic transmission control system includes first reference data for exclusive use with only automatic transmission control and second reference data for exclusive use with both automatic transmission control and vehicle speed control. The second reference data is for decreasing the chance of a gear ratio change by comparison with the first reference data.

13 Claims, 10 Drawing Sheets

ECT_SMAP

| THROTTLE OPENING θN | SPEED STAGE CHANGE | | | | | |
|---|---|---|---|---|---|---|
| | 1→2 | 2→3 | 3→4 | 4→3 | 3→2 | 2→1 |
| TH 7 | 1000 | 1850 | 2700 | 2600 | 1300 | 850 |
| TH 6 | 800 | 1600 | 2100 | 1850 | 950 | 250 |
| TH 5 | 700 | 1200 | 1700 | 1250 | 750 | 200 |
| TH 4 | 550 | 1000 | 1450 | 950 | 500 | 200 |
| TH 3 | 400 | 800 | 1200 | 800 | 450 | 200 |
| TH 2 | 350 | 700 | 1000 | 750 | 450 | 200 |
| TH 1 | 250 | 500 | 750 | 600 | 400 | 200 |
| TH 0 | 250 | 400 | 700 | 400 | 350 | 200 |

OUTPUT OF SP1 ; ROTATIONAL SPEED (RPM)

FIG.13B

ECT_LMAP

| THROTTLE OPENING θN | 2nd SPEED LOCKUP | 3rd SPEED LOCKUP | 4th SPEED LOCKUP | 4th SPEED LOCKUP CANCEL | 3rd SPEED LOCKUP CANCEL | 2nd SPEED LOCKUP CANCEL |
|---|---|---|---|---|---|---|
| TH 7 | 800 | 1200 | 1700 | 1600 | 1050 | 700 |
| TH 6 | 800 | 1200 | 1700 | 1600 | 1050 | 700 |
| TH 5 | 800 | 1200 | 1700 | 1600 | 1050 | 700 |
| TH 4 | 800 | 1200 | 1700 | 1600 | 1000 | 700 |
| TH 3 | 800 | 1000 | 1600 | 1250 | 850 | 700 |
| TH 2 | 800 | 1000 | 1300 | 1000 | 850 | 700 |
| TH 1 | 800 | 1000 | 1150 | 1000 | 850 | 700 |
| TH 0 | 800 | 1000 | 1000 | 1000 | 850 | 700 |

OUTPUT OF SP1 ; ROTATIONAL SPEED (RPM)

FIG.13C

ECT_A/D_SMAP

| THROTTLE OPENING θN | SPEED STAGE CHANGE | | | | | |
|---|---|---|---|---|---|---|
| | 1→2 | 2→3 | 3→4 | 4→3 | 3→2 | 2→1 |
| TH7 | 1200 | 2200 | 3200 | 2700 | 2100 | 850 |
| TH6 | 1000 | 1950 | 3000 | 1950 | 1650 | 700 |
| TH5 | 900 | 1700 | 2400 | 1400 | 1300 | 600 |
| TH4 | 850 | 1500 | 2300 | 1200 | 800 | 500 |
| TH3 | 650 | 1200 | 2000 | 1000 | 600 | 350 |
| TH2 | 450 | 750 | 1500 | 800 | 450 | 250 |
| TH1 | 300 | 550 | 900 | 650 | 400 | 200 |
| TH0 | 250 | 500 | 800 | 400 | 350 | 200 |

OUTPUT OF SP1; ROTATIONAL SPEED (RPM)

FIG.13D

ECT_A/D_LMAP

| THROTTLE OPENING θN | 2nd SPEED LOCKUP | 3rd SPEED LOCKUP | 4th SPEED LOCKUP | 4th SPEED LOCKUP CANCEL | 3rd SPEED LOCKUP CANCEL | 2nd SPEED LOCKUP CANCEL |
|---|---|---|---|---|---|---|
| TH7 | 800 | 2200 | 3150 | 3000 | 2150 | 700 |
| TH6 | 800 | 1950 | 2800 | 2600 | 1900 | 700 |
| TH5 | 800 | 1600 | 2150 | 2000 | 1500 | 700 |
| TH4 | 800 | 1400 | 1900 | 1800 | 1000 | 700 |
| TH3 | 800 | 1350 | 1750 | 1500 | 850 | 700 |
| TH2 | 800 | 1350 | 1600 | 1000 | 850 | 700 |
| TH1 | 800 | 1350 | 1350 | 1000 | 850 | 700 |
| TH0 | 800 | 1350 | 1350 | 1000 | 850 | 700 |

OUTPUT OF SP1; ROTATIONAL SPEED (RPM)

FIG. 14

| SHIFT | THROTTLE OPENING θN | CONDITION OF LOCKUP BEFORE SPEED STAGE CHANGE | INTENDED SPEED STAGE | DT1 VDEV>3km/h | | | | | DT2 VDEV<3km/h (mS) | | | | |
|---|---|---|---|---|---|---|---|---|---|---|---|---|---|
| | | | | T-T1 | T-T2 | T-T3 | T-T4 | T-T5 | T-T1 | T-T2 | T-T3 | T-T4 | T-T5 |
| UPSHIFT | TH3 —TH7 | LOCKUP | 1-3 | 200 | 400 | 800 | 100 | 800 | — | — | — | — | — |
| | | | 4 | 200 | 250 | 700 | 100 | 600 | — | — | — | — | — |
| | | LOCKUP CANCEL | 1-3 | 0 | 0 | 850 | 0 | 750 | — | — | — | — | — |
| | | | 4 | 0 | 0 | 750 | 0 | 550 | — | — | — | — | — |
| | TH0 —TH2 | — | 1-3 | 200 | 0 | 750 | 100 | 750 | — | — | — | — | — |
| | | | 4 | 200 | 0 | 650 | 100 | 650 | — | — | — | — | — |
| DOWN-SHIFT | — | — | 1-2 | 300 | 0 | 750 | 200 | 750 | 4300 | 4000 | 4750 | 4200 | 4750 |
| | | | 3 | 200 | 0 | 850 | 100 | 850 | 4200 | 4000 | 4850 | 4100 | 4850 |

VEHICLE SPEED CONTROL SYSTEM FOR MOTOR VEHICLE HAVING AN AUTOMATIC TRANSMISSION CONTROL SYSTEM

BACKGROUND OF THE INVENTION

1. Field of the Invention

The present invention relates generally to a vehicle speed control system for a motor vehicle having an automatic transmission control system and more particularly to a vehicle speed control system for automatically maintaining the vehicle at a memorized vehicle speed.

2. Description of the Prior Art

In the conventional vehicle speed control system, a throttle valve is controlled so as to maintain the vehicle at a memorized vehicle speed set by a driver. In the conventional automatic transmission, the gear ratio is set to the intended gear ratio by comparing vehicle conditions, such as the vehicle speed, the opening of throttle valve etc., with a shift diagram. Therefore, if the change of opening of the throttle valve is larger than the opening of the throttle valve as controlled by the operation of the vehicle speed control system, the gear ratio in the automatic transmission control system may automatically change in accordance with the shift diagram due to detection of the movement of the throttle valve by the operation of the automatic transmission control system. This change of gear ratio differs from a change of gear ratio in accordance with acceleration or deceleration intended by the driver and occurs at a time unexpected by the driver. Therefore, this change of gear ratio is felt as a shock larger than in a normal gear ratio change intended by the driver More particularly, when driving on a road having many undulations, the change of gear ratio occurs frequently, thereby creating a bad driving sensation.

Furthermore, when the vehicle under speed controlled conditions is climbing an upward slope, the vehicle speed control system causes a hunting operation and cannot maintain the vehicle speed at the memorized vehicle speed whereby the following undesirable operations occur in series:

(1) the vehicle speed is decelerated due to the upward slope of the road, (2) the throttle valve is controlled in the opening direction by the vehicle speed control system so as to prevent the vehicle from deceleration, (3) the gear ratio is downshifted due the detection of this change of throttle valve by the automatic transmission control system, (4) the driving force is increased and as a result, the vehicle speed is accelerated, (5) the opening of the throttle valve is decreased by vehicle speed control system so as to prevent the vehicle from acceleration, (6) the gear ratio is upshifted due to detection of this change of opening of the throttle valve by the automatic transmission control system, (7) the driving force is decreased and as a result, vehicle speed is decreased, and (8) the opening of the throttle valve is increased by vehicle speed control system so as to prevent the vehicle from deceleration.

SUMMARY OF THE INVENTION

It is an object of the present invention to provide a vehicle speed control system or a motor vehicle having an automatic transmission control system that decreases unnecessary gear ratio changes when the vehicle speed control system is operated. To achieve the above object, the present invention provides a system wherein the gear ratio changes in an automatic transmission are selectively operating only under automatic transmission control and second reference data for exclusively operating under both automatic transmission control and vehicle speed control. The second reference data decreases the chance of a gear ratio change in comparison with the first reference data. More specifically, the shift diagram for the second reference data has a hysteresis set to be larger than that of the first reference data so as to decrease the number of repetitions of downshift and upshift.

According to the present invention unnecessary gear ratio changes can be eliminated when the vehicle speed control system is operated. Consequently, the undesirable hunting which usually occurs during gear ratio changes operating under a vehicle speed control system can be eliminated and the reliability of the vehicle speed control system is improved.

The foregoing and other objects, features and advantages of the present invention will be understood more clearly and fully from the following detailed description of preferred embodiments with reference to attached drawings.

DESCRIPTION OF PREFERRED EMBODIMENT

Figure 1:
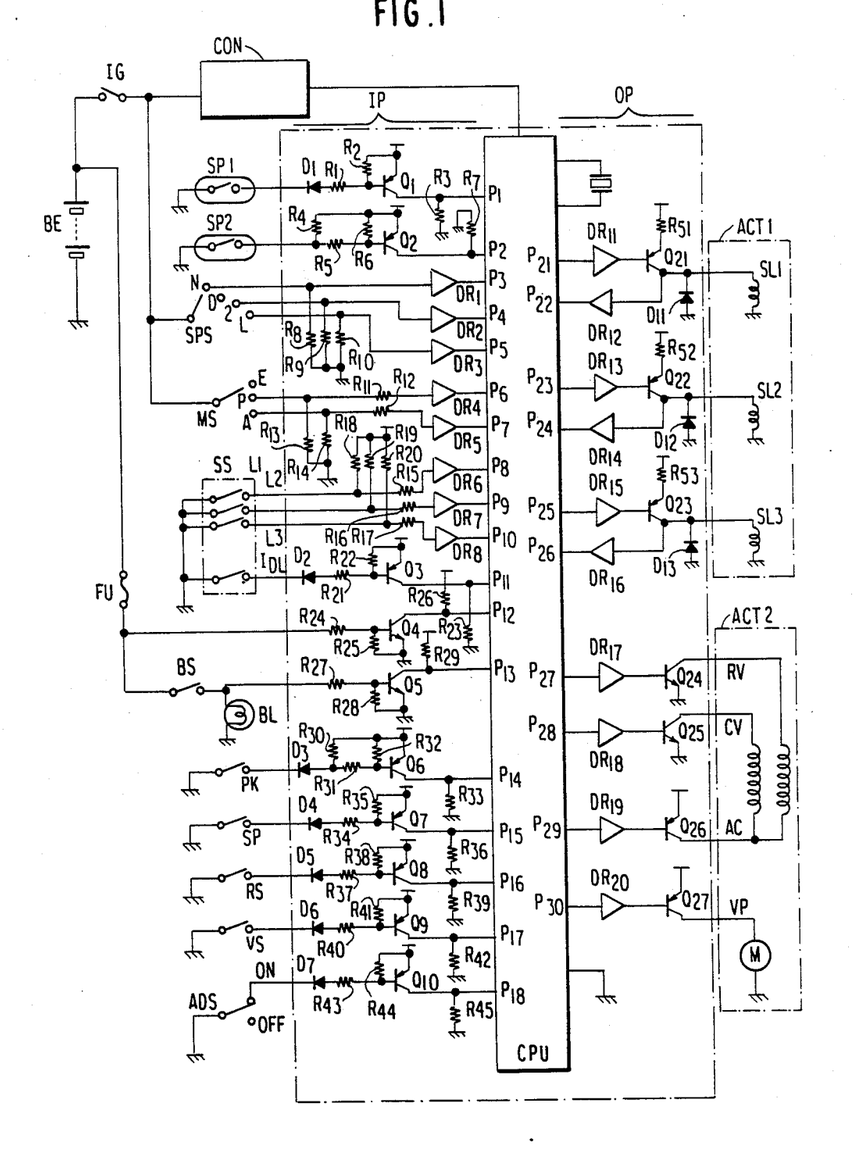
FIG. 1 is an circuit diagram showing the electric control system for controlling operations of a vehicle speed control system and an automatic transmission control system according to one embodiment of the present invention.

Referring to FIG. 1, there is shown an electric circuit of a vehicle speed control system for a motor vehicle having an automatic transmission control system. In this embodiment, the electrical control device is mainly comprised of a microcomputer CPU. The CPU has a microprocessor unit MPV (not shown), a programmable timer PTM (not shown), input ports $P_1$ through $P_{18}$, output ports $P_{21}$ through $P_{30}$, a random access memory RAM (not shown) and a read only memory ROM (not shown). The MPV has two accumulators A and B (not shown) and an index register X (not shown) and executes a program stored in the ROM.

A battery BE is connected to a regulated voltage supply CON via an ignition switch IG. The CPU, an input interface circuit IP and an output interface circuit OP are supplied with the regulated voltage from CON. A speed sensor SP1 comprises a reed switch for generating a frequency signal proportional to the rotational speed of a speedometer cable (not shown) by a permanent magnet (not shown) connected to the speedometer cable. The speed sensor SP1 is connected to the base of transistor $Q_1$ via a diode $D_1$ and a resistor $r_1$. When the speed sensor SP1 is changed to be closed, the transistor $Q_1$ is turned ON. whereby the input port $P_1$ of CPU changes to the "H" level. On the other hand, when the speed sensor SP2 is changed to be opened, the transistor $Q_1$ is turned OFF. where the input port $P_1$ of CPU changes to the "L" level.

A speed sensor SP2 is comprised of a reed switch for generating a frequency signal proportional to the rotational speed of an output shaft (not shown) in the automatic transmission by a permanent magnet (not shown) connected to the output shaft of the automatic transmission. The speed sensor SP2 is connected with the base of transistor $Q_2$ via a resistor $R_5$. When the speed sensor SP2 is changed to be closed, the transistor $Q_2$ is turned ON. whereby the input port $P_2$ of CPU changes to the "H" level. On the other hand, when the speed sensor SP2 is changed to be opened, the transistor $Q_2$ is turned OFF. whereby the input port $P_2$ of CPU changes to the "L" level.

A shift position switch SPS for detecting the position of a shift lever (not shown) comprises a neutral range switch SPS-N. a drive range switch SPS-D, a second speed range switch SPS-2 and a low speed range switch SPS-L. When the shift level is positioned at the neutral range, the switch SPS-N is turned ON. When the shift lever is positioned at the drive range, the reverse range or the parking range, the switch SPS-D is turned ON. When the shift lever is positioned at the second speed range, the switch SPS-2 is turned ON. When the shift lever is positioned the low speed range. the switch SPS L is turned ON. The switch SPS-N is connected to the input port $P_3$ of CPU A BUFFER $DR_1$. The switch SPS-2 is connected to the input port $P_4$ of CPU via a buffer $DR_2$. The switch SPS-L is connected to the input $P_5$ of CPU via a buffer $DR_3$. Each input port $P_3$, $P_4$ and $P_5$ of the CPU is changed to the "H" level in accordance with the ON state of each switch SPS-N, SPS-2 and SPS-L, respectively. On the other hand, each input port $P_3$, $P_4$ and $P_5$ of the CPU is changed to the "L" level in accordance with OFF state of each switch SPS-N, SPS-2 and SPS-L. respectively.

A mode switch MS for setting the mode in the vehicle speed control to an economy mode, a power mode or an auto drive mode is comprised of an economy mode switch MS-E, a power mode switch MS-P and an auto drive mode switch MS-A. The economy mode switch MS-E is turned ON in the economy mode. The power mode switch MS-P is turned ON in the power mode. The auto drive mode switch MS-A is turned ON in the auto drive mode. The power mode switch MS-P is connected to the input port $P_6$ of CPU via a resistor $R_{11}$ and a buffer $DR_4$. The auto drive mode switch MS-A is connected to the input port $P_7$ of CPU via a resistor $R_{12}$ and a buffer $DR_5$. Each input port $P_6$ and $P_7$ of CPU is changed to the "H" level in accordance with the ON state of each mode switch MS-P and MS-A respectively.

A throttle opening sensor SS is for detecting the opening degree of a throttle valve (not shown) and comprises three contacts $L_1$, $L_2$ and $L_3$ for dividing the throttle opening to eight stages $\theta_0$ through $\theta_7$ and a contact IDL for detecting an engine idling condition. The relationship between the throttle opening stages $\theta_0$ through $\theta_7$ and the states of contacts $L_1$, $L_2$ and $L_3$ is as follows:

| THROTTLE OPENING | STATES OF CONTACTS | | |
|---|---|---|---|
| | $L_1$ | $L_2$ | $L_3$ |
| $\theta_0$ | OFF | OFF | OFF |
| $\theta_1$ | OFF | OFF | ON |
| $\theta_2$ | OFF | ON | ON |
| $\theta_3$ | OFF | ON | OFF |
| $\theta_4$ | ON | ON | OFF |
| $\theta_5$ | ON | ON | ON |
| $\theta_6$ | ON | OFF | ON |
| $\theta_7$ | ON | OFF | OFF |

Each contact $L_1$, $L_2$ and $L_3$ is connected to each input port $P_8$, $P_9$ and $P_{10}$ of the CPU via resistors $R_{15}$, $R_{16}$ and $R_{17}$ and buffers $DR_6$, $DR_7$ and $DR_8$. When each contact $L_1$, $L_2$ and $L_3$ is turned ON. each input port $P_8$, $P_9$ and $P_{10}$ is changed to the "L" level, respectively. On the other hand, when each contact $L_1$, $L_2$ and $L_3$ is turned OFF. each input port $P_8$, $P_9$ and $P_{10}$ is changed to the "H" level. The contact IDL is turned ON only when the throttle opening is completely closed. The contact IDL is connected to the base of transistor $Q_3$ via a diode $D_2$ and a resistor $R_{21}$. When the contact IDL is turned OFF, the transistor $Q_3$ is turned OFF, whereby the input port $P_{11}$ of CPU is changed to the "L" level. On the other hand, when the contact IDL is turned ON. the transistor $Q_3$ is turned ON. whereby the input port $P_{11}$ is changed to the "H" level.

A brake lamp BL is connected to the battery BE via a brake switch BS and a fuse FU. One end of brake switch BS is connected to a base of transistor $Q_4$ via a resistor $R_{24}$. The other end of brake switch BS is connected to a base of transistor $Q_5$ via a resistor $R_{27}$. The collector of transistor $Q_4$ and $Q_5$ is connected to input ports $P_{12}$ and $P_{13}$ of the CPU, respectively. When the brake switch BS is turned ON, the input port $P_{13}$ is changed to the "L" level. On the other hand, when the brake switch BS is turned OFF. the input port $P_{13}$ is changed to the "H" level. The input port $P_{12}$ is usually at the "L" level but is changed to the "H" level only when the fuse FU is melted.

A parking brake switch PK is turned ON when a parking brake (not shown) is operated. A set switch P and a resume switch RS for the vehicle speed control system are each comprised of a push button type switch wherein the switch is turned ON when the switch is pushed and is turned OFF when the switch is not pushed. A vacuum switch VS is for detecting vacuum in a surge tank (not shown). Such vacuum is required to operate the vehicle speed control system. The vacuum switch VS is turned ON when vacuum pressure is higher than a preset value. On the other hand, the vacuum switch is turned OFF when vacuum pressure is lower than the preset valve (In this case the vacuum pressure approaches atmospheric pressure). The parking brake switch PK. the set switch SP, the resume switch RS and the vacuum switch VS are connected to the input ports $P_{14}$, $P_{15}$, $P_{16}$ and $P_{17}$ of CPU via diodes $D_3$, $D_4$, $D_5$ and $D_6$, resistors $R_{31}$, $R_{34}$, $R_{37}$ and $R_{40}$, and transistors $Q_6$, $Q_7$, $Q_8$ and $Q_9$, respectively. When each parking brake switch PK, set switch SP, resume switch RS and vacuum switch VS is turned ON. the input ports $P_{14}$, $P_{15}$, $P_{16}$ and $P_{17}$ of CPU are changed to the "H" level, respectively. On the other hand, when each parking brake switch PK, set switch SP, resume switch RS and vacuum switch VS is turned OFF, the input ports $P_{14}$, $P_{15}$, $P_{16}$ and $P_{17}$ of CPU are changed to the "L" level.

A main switch ADS for the vehicle speed control has a ON contact and a OFF contact. The ON contact of main switch ADS is connected to the input port $P_{18}$ of the CPU via a diode $D_7$, a register $R_{43}$ and a transistor $Q_{10}$. When the main switch ADS is turned ON, the input port $P_{18}$ of CPU is changed to the "H" level. On the other hand, when the main switch ADS is turned OFF. the input port $P_{18}$ of CPU is changed to the "L" level.

An actuator ACT1 for the automatic transmission comprises shift solenoids SL1 and SL2 and lockup solenoid SL3. The shift solenoids SL1 and SL2 are for shifting of automatic transmission gearing. The relationship between the shift solenoids SL1 and SL2 with respect to the times they are electrically-energerized and electrically deenergized and the condition of the automatic transmission gearing are as as follows:

| SHIFT SOLE- NOIDS | SPEED STAGES | | | |
| --- | --- | --- | --- | --- |
| | 1st Speed | 2nd. Speed | 3rd. Speed | Over Drive Speed |
| SL1 | Energized | Energized | Deenergized | Deenergized |
| SL2 | Deenergized | Energized | Energized | Deenergized |

The lockup solenoid SL3 is for controlling a lockup clutch (not shown) for accomplishing direct engagement of an output shaft of an engine (not shown) with an input shaft (not shown) of a torque converter. When the lockup solenoid SL3 is energized, the lockup clutch is engaged and therefore the lockup operation is accomplished. On the other hand, when the lockup solenoid SL3 is deenergized, the lockup clutch is disengaged and therefore the lockup operation is released. The shift solenoids SL1 and SL2 and the lockup solenoid SL3 operate in accordance with the condition of the output ports $P_{21}$, $P_{23}$ and $P_{25}$ of the CPU. When the output port $P_{21}$ of the CPU is changed to the "L" level, the shift solenoid SL1 is changed to be energized via a driver $DR_{11}$ and a transistor $Q_{21}$. On the other hand, when the output port $P_{21}$ of the CPU is changed to the "H" level, the shift solenoid SL1 is changed to be deenergized.

When the output port $P_{23}$ of the CPU is changed to the "L" level, the shift solenoid SL2 is changed to be energized via a driver $DR_{13}$ and a transistor $Q_{22}$. On the other hand, when the output port $P_{23}$ of CPU is changed to "H" level, the shift solenoid SL2 is deenergized. When the output port $P_{25}$ of the CPU is changed to the "L" level, the lockup solenoid SL3 is energized via a driver $DR_{15}$ and a transistor $Q_{23}$. On the other hand, when the output port $P_{25}$ is changed to the "H" level, the lockup solenoid SL3 is deenergized.

Figure 2:
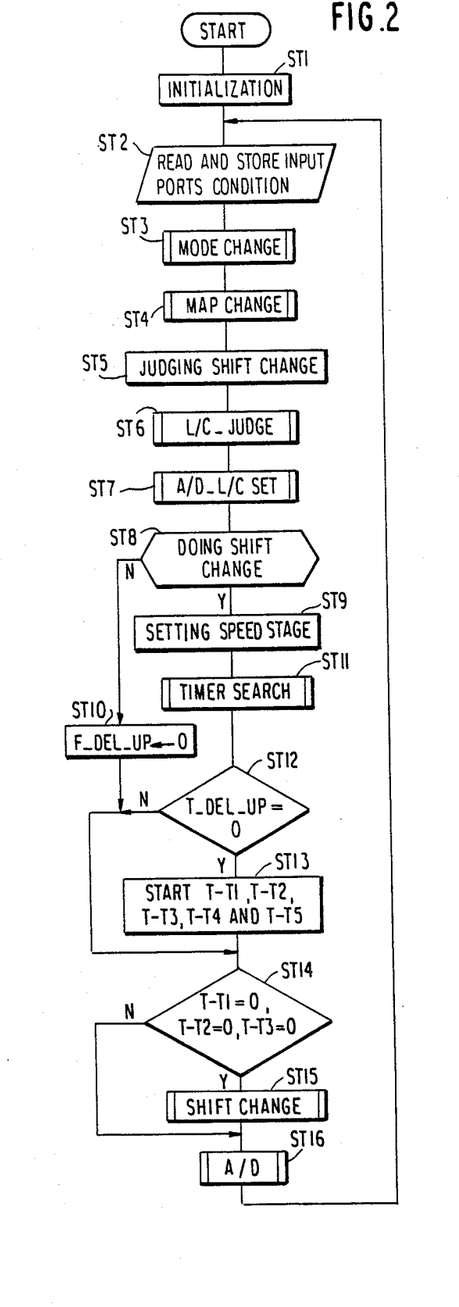
FIG. 2 is a flow chart showing a main routine for the microcomputer CPU in FIG. 1.

An actuator ACT2 for vehicle speed control comprises a release valve RV, a control valve CV, a vacuum pump VP, the surge tank and a vacuum actuator (not shown). The vacuum pump VP operates as a vacuum source and vacuum generated by vacuum pump VP is stored in the surge tank. The vacuum pump VP generates vacuum when motor M rotates. Vacuum in the surge tank is supplied to the vacuum actuator via release valve RV and control valve CV. The surge tank is communicated with the vacuum actuator when the release valve is changed to be energized. On the other hand, vacuum in the vacuum actuator is released to atmosphere via release valve RV when the release valve RV is deenergized. The surge tank is communicated with the vacuum actuator when the control valve CV is energized. On the other hand, the surge tank is disconnected from the vacuum actuator when the control valve CV is deenergized. The vacuum actuator controls the degree of opening of throttle valve whereby vehicle speed is controlled. The release valve RV and the control valve CV are controlled in accordance with the condition of output ports $P_{27}$, $P_{28}$ and $P_{29}$ of the CPU. When the output port $P_{27}$ of CPU is changed to the "H" level, a transistor $Q_{24}$ is turned ON via a driver $DR_{17}$. On the other hand, when the output port $P_{27}$ of CPU is changed to the "L" level, the transistor $Q_{24}$ is turned OFF. When the output port $P_{28}$ of the CPU is changed to the "H" level, the transistor $Q_{25}$ is turned ON via a driver $DR_{18}$. On the other hand, when the output port $P_{28}$ of the CPU is changed to the "L" level, the transistor $Q_{25}$ is turned OFF. When the output port $Q_{29}$ of the CPU is changed to the "L" level, the transistor $Q_{26}$ is turned ON via a driver $DR_{19}$. On the other hand, when the output port $P_{29}$ of the CPU is changed to the "H" level, the transistor $Q_{26}$ is turned OFF. The release valve RV is changed to be energized when both transistors $Q_{26}$ and $Q_{24}$ are turned ON. On the other hand, the release valve RV is changed to be deenergized when one of transistors $Q_{24}$ and $Q_{26}$ is turned OFF. The control valve CV is changed to be energized when operation as shown in FIG. 2.

Figure 13A:
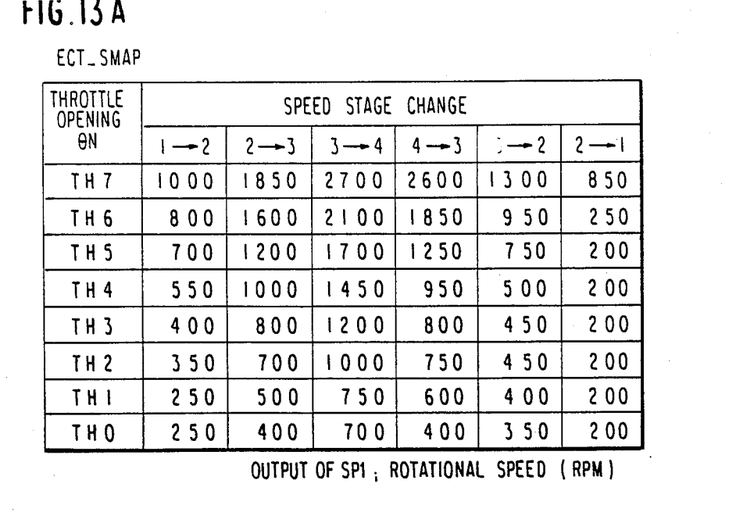
FIG. 13A is a flow chart showing a shift diagram for operating only under the automatic transmission control system which is stored in the CPU.
Figure 13B:
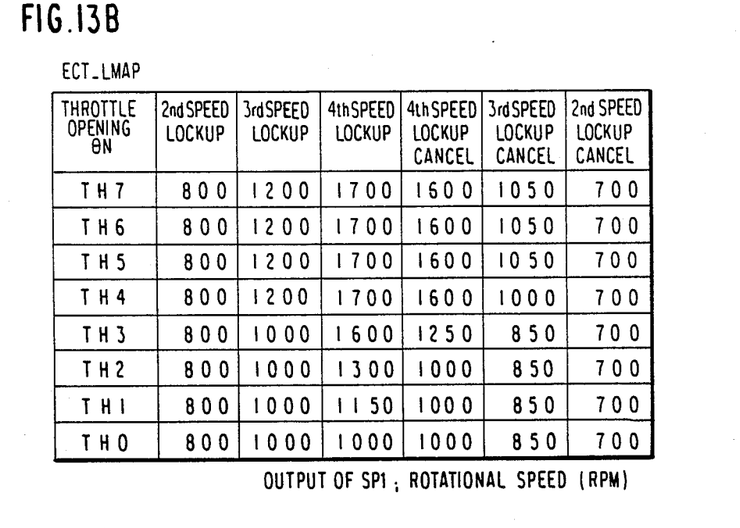
FIG. 13B is a table showing a lockup diagram for operating only under the automatic transmission control system which is stored in the CPU.
Figure 13C:
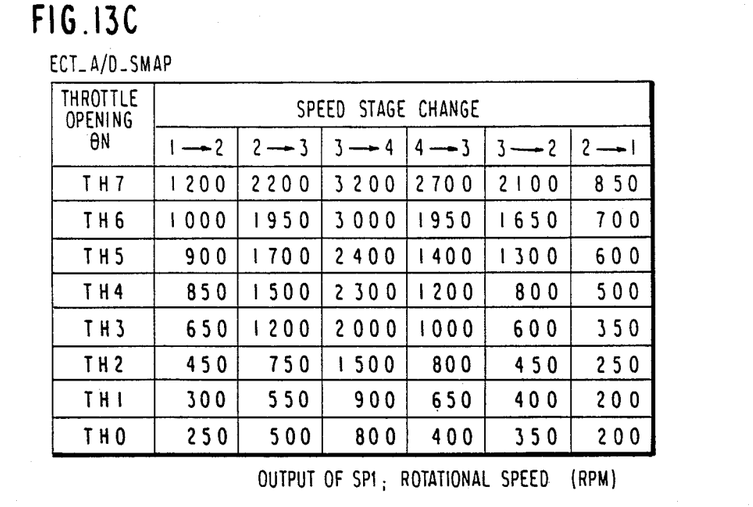
FIG. 13C is a table showing a shift diagram for operating under both the automatic transmission control system and the vehicle speed control system which is stored in the CPU.
Figure 13D:
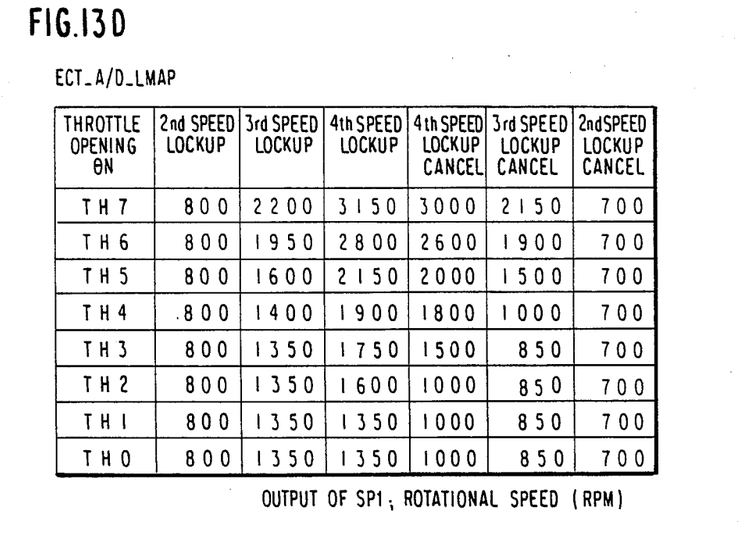
FIG. 13D is a table showing a lockup diagram for operating under both the automatic transmission control system and the vehicle speed control system which stored in the CPU.
Figure 14:
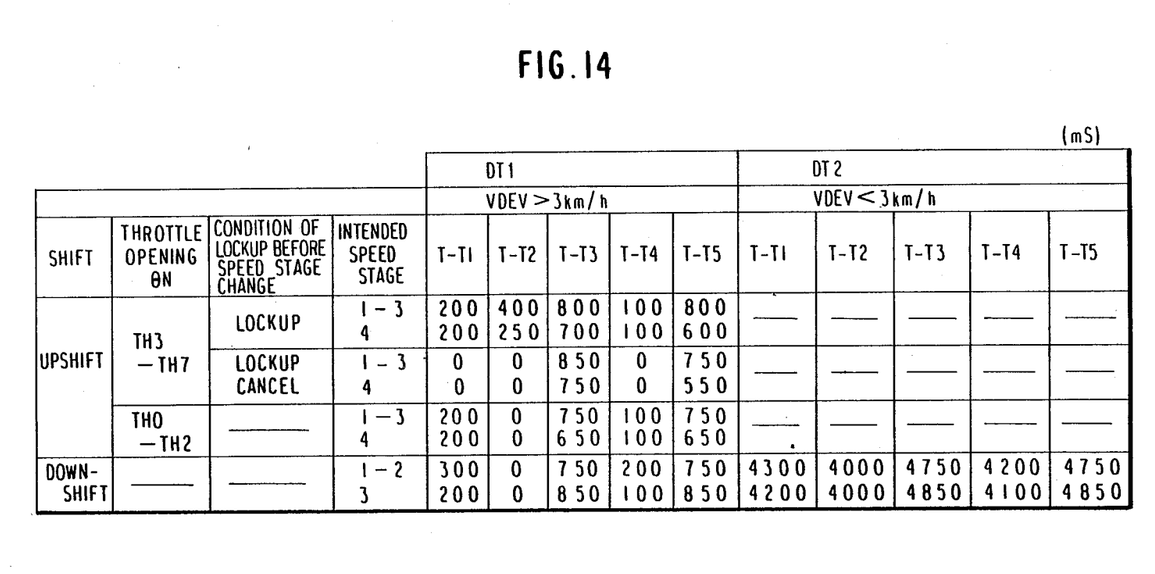
FIG. 14 is a table showing a timer diagram for shift change which is stored in the CPU.

Stored in the ROM of the CPU are a first shift charge map ECT-SMAP as shown in FIG. 13A for exclusively operating under only automatic transmission control, a second shift change map ECT-A/D-SMAP as shown in FIG. 13C for exclusively operating under both automatic transmission control and vehicle speed control and which has a hysteresis set to be larger than that of the first shift change map ECT SMAP so as to decrease number of repetitions of downshift and upshift, a first lockup map ECT-LMAP as shown in FIG. 13B for controlling the lockup clutch and exclusively operating under only automatic transmission control, a second lockup ECT-A/D-LMAP as shown in FIG. 13D for controlling the lockup clutch and exclusively operating under both automatic transmission control and vehicle speed control and which has a hysteresis set to be larger than that of the first lockup map ECT-LMAP a time is set in accordance with the shift change direction (upshift or downshift). throttle opening, condition of lockup and deviation of vehicle speed against the memorized vehicle speed, respectively. The timer $T-T_1$ is for setting a time to output the shift change from shift change judging. The timer $T-T_2$ is for setting a time for lockup releasing from shift change judging. The timer $T-T_3$ is for setting a time for lockup upon timing and of timer $T-T_1$. The timer $T-T_4$ is for setting a time for throttle opening changing from shift change judging. The timer $T-T_5$ is for setting a time for finishing of throttle valve control upon timing and of time $T-T_4$.

When the CPU is operated, input and output ports are set at respective initial levels and the content of the memory is cleared (ST1). In this Step ST1, ports $P_1$ through $P_{18}$, $P_{22}$, $P_{24}$ and $P_{26}$ are set as input ports and ports $P_{21}$, $P_{23}$, $P_{25}$ and $P_{27}$ through $P_{30}$ are set as output ports. Also all flags are set to the initial level thereof.

Figure 3:
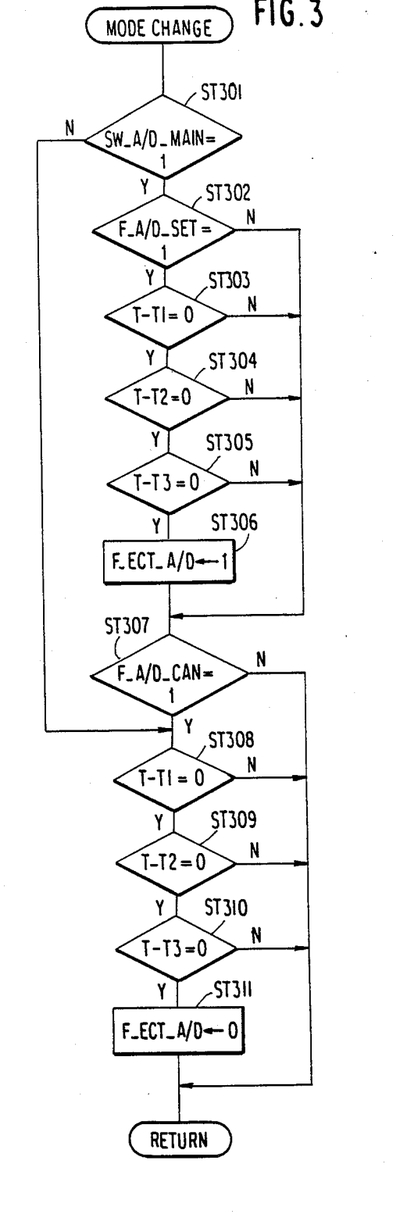
FIG. 3 is a flow chart showing a sub routine MODE CHANGE of the CPU.
Figures 4, 5:
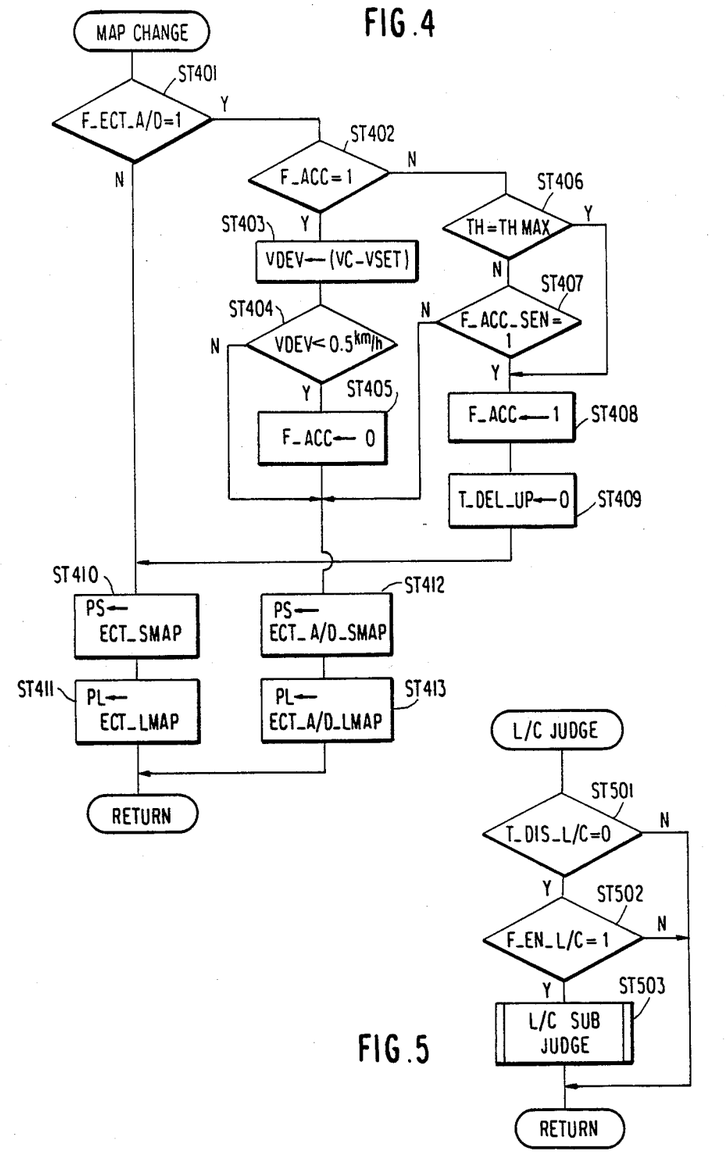
FIG. 4 is a flow chart showing a sub routine MAP CHANGE of the CPU.
FIG. 5 is a flow chart showing a sub routine L/C JUDGE of the CPU.
Figure 6:
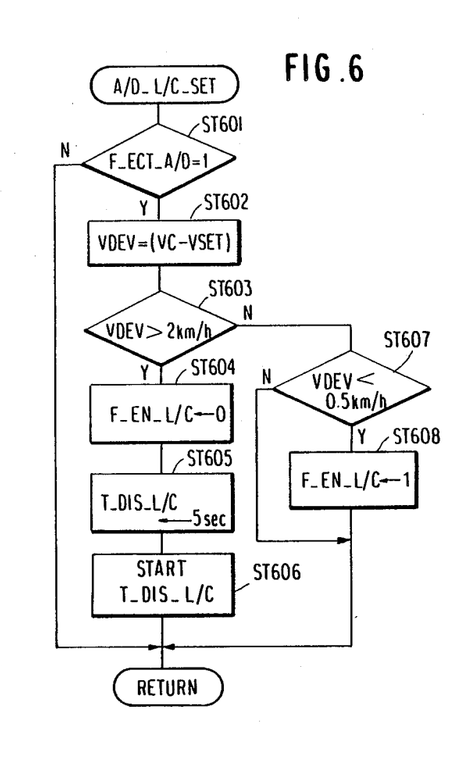
FIG. 6 is a flow chart showing a sub routine A/D L/C SET of the CPU.

The condition of each input port is read out and stored in the memory as follows (ST2): SW-D to "1" when the shift lever is positioned at one of the drive range, the reverse range and the parking range and is set to "0" when the shift lever is positioned at a position other than the aforesaid positions. SW-BK is set to "1" when the brake switch BS is turned ON and is set to "0" when the brake switch BS is turned OFF. SW-PKB is set to "1" when the parking brake switch PK is turned ON and is set to "0" when the parking brake switch PK is turned OFF. SW-A/D-SET is set to "1" when the set switch SP is turned ON and set to "0" when the set switch SP is turned OFF. SW-A/D-RES is set to "1" when the resume switch RS is turned ON and is set to "0" when the resume switch RS is turned OFF. SW-A/D-MAIN is set to "1" when the main switch ADS is turned ON and is set to "0" when the main switch ADS is turned OFF. A sub routine MODE CHANGE (ST3) as shown in FIG. 3 is executed for changing to one of the ECT mode for controlling only automatic transmission control and ECT-A/D mode for controlling both automatic transmission control and vehicle speed control from the other mode. A sub routine MAP CHANGE (ST4) as shown in FIG. 4 is executed for changing one of the shift change map and lockup map to the other map. A judgement of shift change is executed by comprising the condition of input ports with the shift change map (ST5). A sub routine L/C JUDGE as shown in FIG. 5 for judging lockup is executed (ST6). A sub routine A/D L/C SET as shown in FIG. 6 for setting lockup under vehicle speed control is executed (ST7). Then, in Step ST8, when the changing of shift change was decided at Step ST5, the program goes forward to Step ST9. On the other hand, when the change of shift change was not decided at Step ST5, the program goes forward to Step ST10.

Figure 7:
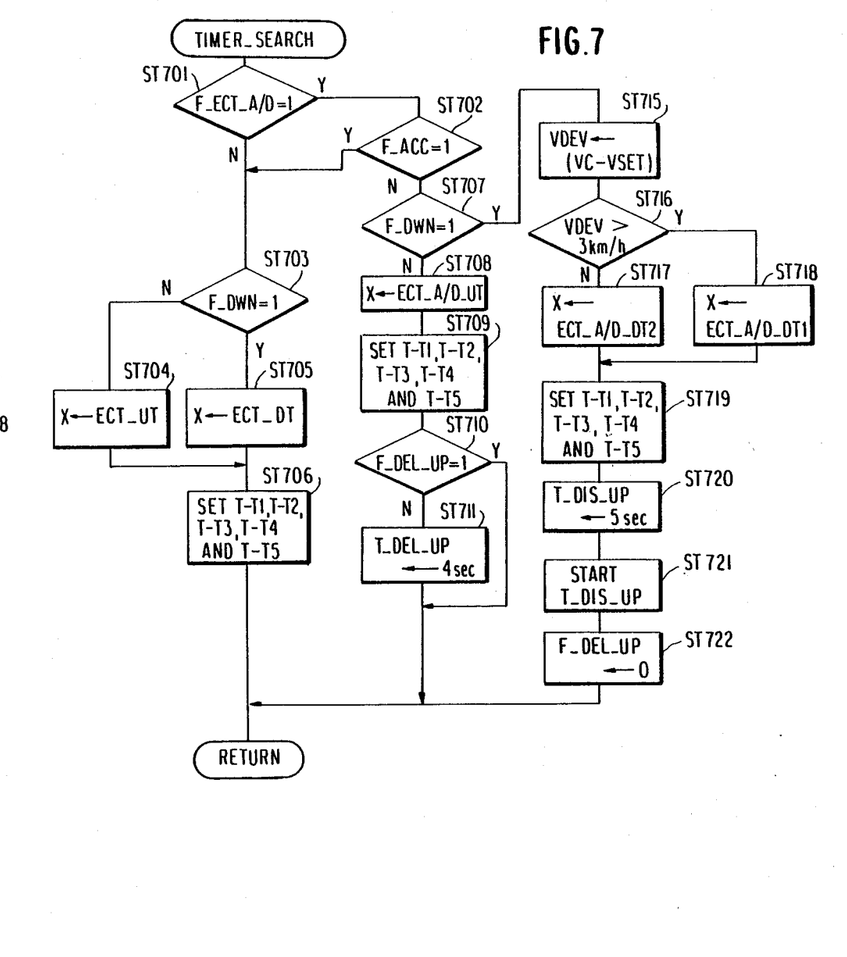
FIG. 7 is a flow chart showing a sub routine TIMER SEARCH of the CPU.

A speed stage intended is set at Step ST9. A sub routine TIMER SEARCH as shown in FIG. 7 for setting the shift timers is executed (ST11). In Step ST12, when a timer T-DEL-UP for delaying upshift is timed out, the program goes forward to Step ST13, on the other hand, when the timer T-DEL-UP is not timed out, the program goes forward to Step ST14. In Step ST13, the timers $T-T_1$, $T-T_2$, $T-T_3$, $T-T_4$ and $T-T_5$ are started.

In Step ST10, a flag F-DEL-UP is set to "0".

Figures 8, 10:
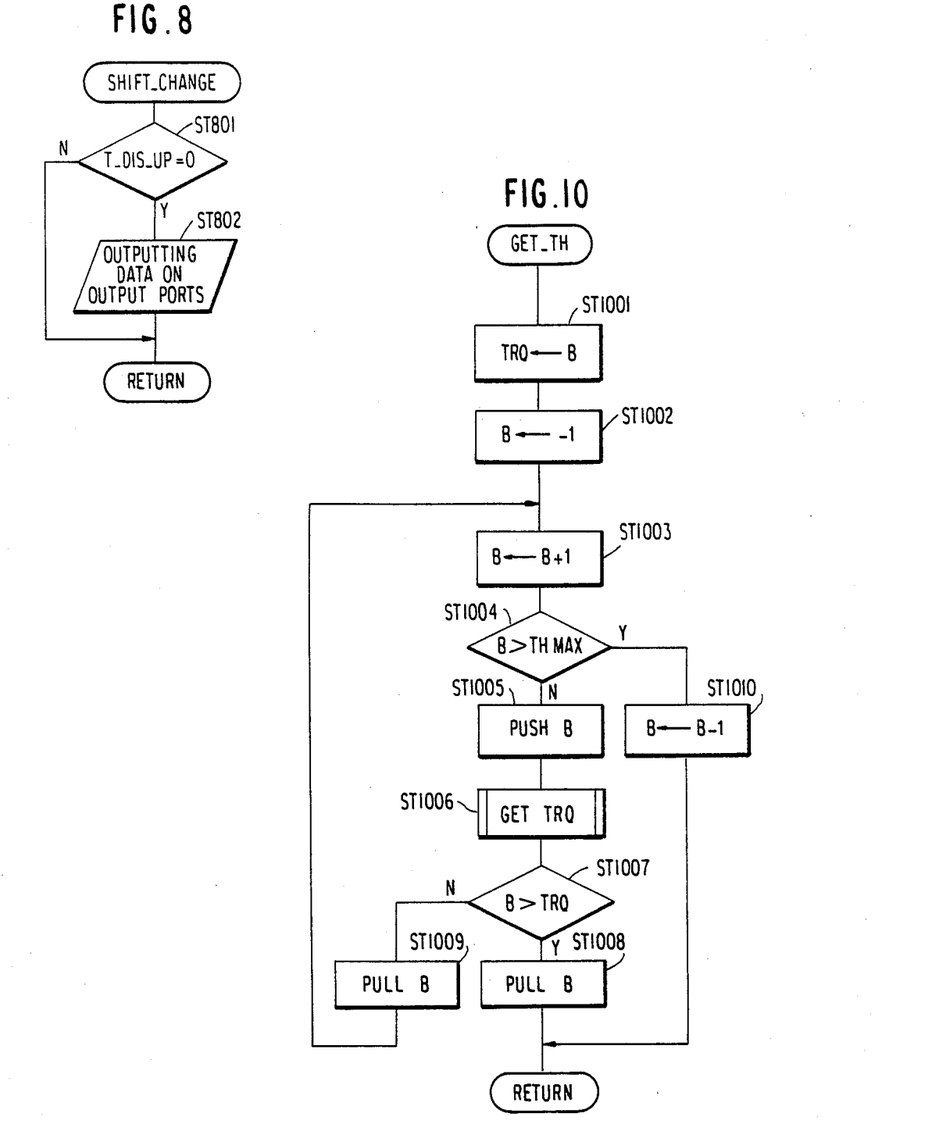
FIG. 8 is a flow chart showing a sub routine SHIFT CHANGE of the CPU.
FIG. 10 is a flow chart showing a sub routine GET TH of the CPU.
Figure 9:
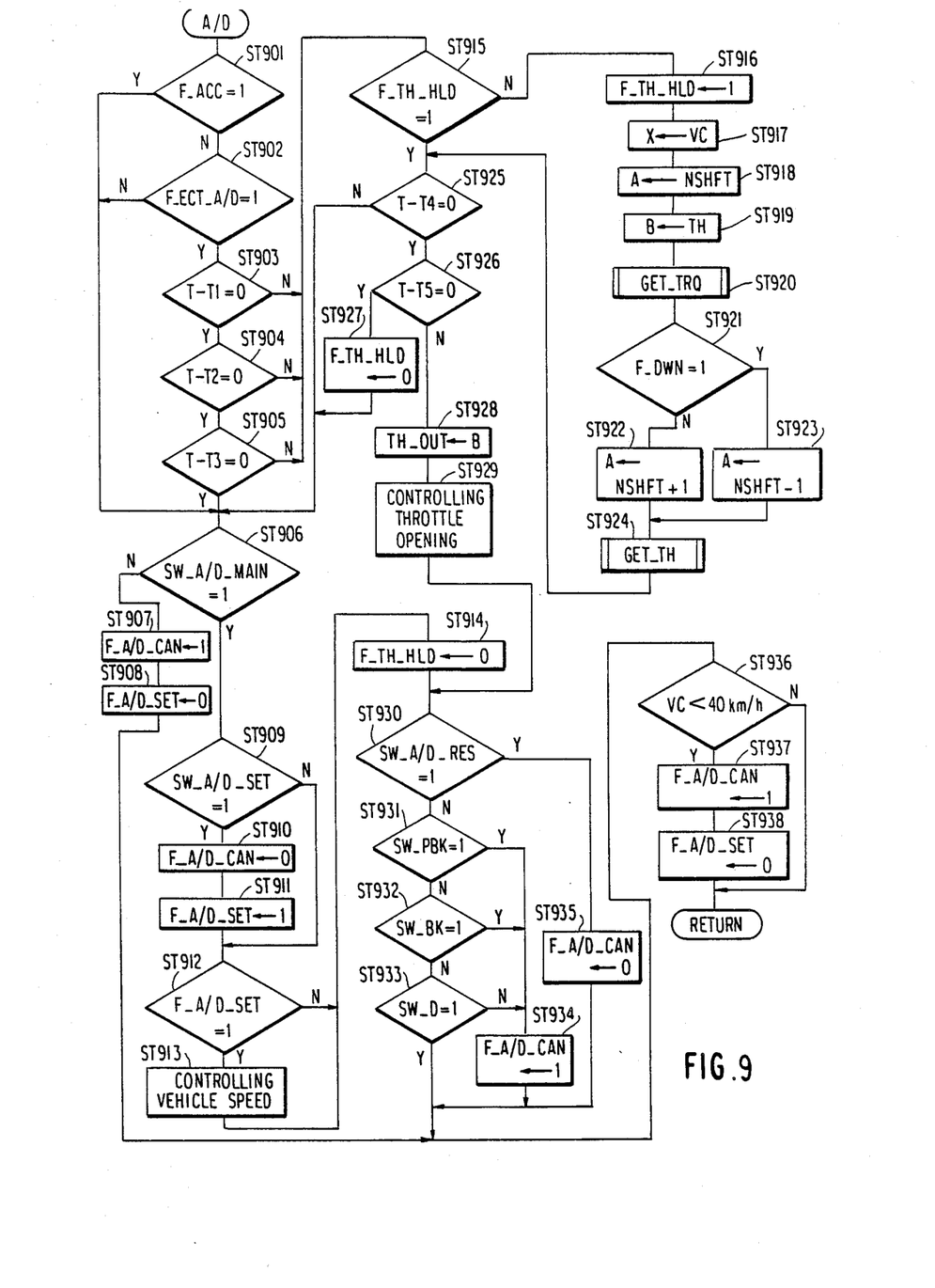
FIG. 9 is a flow chart showing a sub routine A/D of the CPU.

In Step ST14, when it is not on shift change namely when timers $T-T_1$, $T-T_2$ and $T-T_3$ are timed out, the program goes forward to a Step ST15. On the other hand, when it is on shift change, the program goes forward to a Step ST16. In Step ST15, a sub routine SHIFT CHANGE as shown in FIG. 8 is executed. In Step ST16, a sub routine A/D as shown in FIG. 9 for controlling the vehicle speed control is executed. After Step ST16, the program returns to Step ST2, and repeats the execution indicated within Step $ST_2$ through Step ST16.

In the sub routine MODE CHANGE in FIG. 3, there is a mode ECT for only controlling the automatic transmission control system and a mode ECT-A/D for both automatic transmission control system and the vehicle speed control system. When it is the mode ECT-A/D. a flag F-ECT-A/D is set to "1" and, on the other hand, when it is the mode ECT, the flag F-ECT-A/D is set to "0". In Step ST301, when the SW-A/D-MAIN is "1" namely the main switch ADS for vehicle speed control is turned ON. the program goes forward to Step ST302. On the other hand, when the SW-A/D-MAIN is "0" namely the main switch ADS is turned OFF. the program goes forward to Step ST308. In Steps ST302. ST303, ST304 and ST305, when a flag F-A/D-SET changing to "1" under vehicle speed control is kept to "1" and timers $T-T_1$, $T-T_2$ and $T\ T_3$ are changed to "0" (time over) namely it is not on shift change under vehicle speed control, the program goes forward to a Step ST306, and the flag F-ECT-A/D is set to "1" (ST306). In any other conditions except the aforesaid condition, the program goes forward to Step ST307 by the Steps ST302, ST303, ST304 and ST305. In Step ST307, when a flag F-A/D-CAN changing to "1" upon cancellation of vehicle speed control is kept to "1", the program goes forward to a Step ST308, on the other hand, when the flag F-A/D-CAN is kept to "0", the program returns to the main routine. When the flag F-A/D-CAN is "1" or the memory SW-AD-MAIN is "0", the program comes to Step ST308. In Step ST308 and Steps ST309, ST310 and ST311, when times $T-T_1$, $T-T_2$ and $T-T_3$ are all "0" namely it is not on shift change upon cancellation of vehicle speed control, the flag F-ECT-A/D is set to "0" at Step ST311. As noted above, in this sub routine MODE CHANGE. the changing of modes ECT and ECT-A/D is accomplished but is inhibited during a shift change by Steps ST303, ST304, ST305, ST308, ST309 and ST310.

In the sub routine MAP CHANGE in FIG. 4, when the flag F-ECT-A/D is "0" at Step ST401, the program goes forward to Step ST410. On the other hand, when the flag F-ECT-A/D is "1". the program goes forward to Step ST402. In Step ST402, when a flag F-ACC changing to "1" under accelerator pedal operation is kept to "1", the program goes forward to Step ST403. If the flag F-ACC is kept to "0". the program goes forward to Step ST406. When a deviation VDEV between a present vehicle speed VC and a memorized vehicle speed VSET set by pushing the set switch SP is less than 0.5 Km/n a flag F-ACC is set to "0" (ST403), ST404, ST405). In Step ST406 and ST407, when a flag F-ACC-SEN changing to "1" under rapid throttle action and except the maximum value TH MAX of throttle opening TH is kept to "0", the program foes forward to Step ST412. If the flag F-ACC-SEN is "0" at the Step ST407, the program goes forward to Step ST410 after that the flag F-ACC is set to "1" at Step ST408 and then a timer T-DEL-UP is set to "0" at a Step ST409. The shift change map ECT-SMAP and the lockup map ECT-LMAP are set respectively (ST410, ST411). Also the shift change map ECT-A/D-SMAP and the lockup map ECT-A/D-LMAP are set (ST412. ST413). As noted above, in this sub routine MAP CHANGE. flags F-ACC and F-ACC-SEN are operated and maps for shift change and lockup are changed and the program returns to the main routine.

In the sub routine L/C JUDGE as shown in FIG. 5 for judging availability of lockup, the lockup is set by comparing the lockup map with the present vehicle speed VC and the throttle opening TH at Step ST503, but if a timer T-DIS L/C for inhibiting the lockup is not timed out or a flag F-EN-L/C for permitting the lockup at "1" is "0", the Step ST503 is not executed and the program returns to the main routine.

The sub routine A/D-L/C-SET in FIG. 6 is for setting lockup under vehicle speed control. If it is in the mode ECT. this sub routine A/D-L/C-SET is skipped by a Step ST601. When it is in the mode ECT-A/D. the deviation VDEV is calculated (ST602). When the VDEV is more than 2 Km/$n$, a flag F-EN-LC is set to "0", inhibits the lockup and the timer T-DIS L/C is set to 5 sec. and is started (ST603, ST604, ST605 and ST606). The time T-DIS-L/C is timed out after 5 sec., whereby the lockup is inhibited during this 5 sec. When the VDEV is less than 0.5 Km/$n$, the flag F-EN-L/C is set to "1" and the lockup is permitted (ST607 and ST608).

The sub routine TIMER SEARCH in FIG. 7 is for setting a time on the shift timers $T-T_1$, $T-T_2$, $T-T_3$, $T-T_4$ AND $T-T_5$, when it is in the mode ECT or in the mode ECT-A/D under accelerator pedal operation (ST701 and ST702). the setting of timers is executed in accordance with Steps ST703, ST704, ST705 and ST706. When it is the mode ECT-A/D under non-operation of acceleration pedal, the setting of timers is executed after Step ST707. In the Steps ST703 through ST706, when the shift change is an upshift, an address ECT-UT for the times stored in the memory for the times during upshift is applied to the index register X, but if it is a downshift, an address ECT-DT for the times stored in the memory for the times during downshift is applied to the index register X. Thereafter, the contents of the address in index register X are read and each value memorized on the address indicated by the index register IX is set as the times for timers $T-T_1$, $T-T_2$, $T-T_3$, $T-T_4$ and $T-T_5$. In Step ST707, when the shift change is an upshift, the program executes Steps ST708 through ST711, but if it is a downshift, the program executes Steps ST715 through ST722. In an upshift, the content in address ECT-A/D-UT is set to the index register X and each value memorized on the address indicated by the index register IX is set as the times of timers $T-T_1$, $T-T_2$, $T-T_3$, $T-T_4$ and $T-T_5$ (ST708 and ST709). Then, when a flag F-DEL-UP changing to "1" under delay of upshift is kept to "0", a timer T-DEL-UP is set to 4 sec (ST710 and ST711). In the downshift, when the deviation VDEV is less than 3 Km/$n$, the content of address ECT-A/D-DT2 is set to the index register X and if the deviation VDEV is more than 3 Km/$n$, the content of address ECT-AD-DT1 is set to the index register X (ST716, ST717, ST718). Then, the value memorized on the address indicated by the index register X is set as the time of timers $T-T_1$, $T-T_2$, $T-T_3$, $T-T_4$ and $T-T_5$ (ST719) Then, a timer T-DIS-UP for inhibiting upshift is set to 5 sec. and is started and the flag F-DEL-UP is set to "0" (ST720, ST721, ST722). As noted above, in this sub routine TIMER SEARCH. the time in shift timers $T-T_1$, $T-T_2$, $T-T_3$, $T-T_4$ and $T-T_5$ is set in accordance with several conditions, the upshift under the ECT-A/D mode and non-operated condition of the accelerator pedal is delayed by 4 sec., and the upshift is inhibited by 5 sec. under ECT-A/D mode and non-operated condition of the accelerator pedal.

The sub routine SHIFT CHANGE in FIG. 8 is for changing the gear ratio. When the timer T-BIS-UP for inhibiting upshift is "0", the data appears at the output port (ST801, ST802).

The sub routine A/D in FIG. 9 is for controlling vehicle speed. When the accelerator pedal is operated on the ECT mode is in effect, even if under non-operated condition of the accelerator pedal, the program goes forwarded to Step ST906. When it is not on shift change under non-operated condition of the accelerator pedal and the ECT-A/D mode is in effect, the program also goes forward to the Step ST906. On the other hand, when it is on shift change under non-operated condition of the accelerator pedal and the ECT-A/D mode is in effect, the program goes forward to a Step ST915. In Step ST906, when the main switch ADS for vehicle speed control is turned OFF. the program goes forward to Step ST907. When the main switch ADS is turned ON, the program goes forward to a Step ST909. In Steps ST907 and ST908, flag F-A/D-CAN is set to "1" whereby the vehicle speed control is changed to be cancelled and flag F-A/D-SET is set to "0" whereby the vehicle speed control is reset. The program then skips to Step ST936. In Steps ST909 through ST914, when the set switch SP is turned ON, the flag F-A/D-CAN is set to "0" whereby the cancellation of vehicle speed control is released and the flag F-A/D-SET is set to "1" whereby the vehicle speed control is set. If the flag F-A/D-SET is "1", the vehicle speed control is accomplished and a flag F-TH-HLD is set to "0". In the Step ST915, when the flag F-TH-HLD is "1". the program goes forward to a Step ST925, but when the flag F-TH-HLD is "0". the program goes forward to the Step ST925 via Steps ST916 through ST924. In the Steps ST916 through ST924, the flag F-TH-HLD is set to "1", then the present vehicle speed VC. the present speed stage N SHIFT and the present throttle opening TH are stored in the index register X. the accumulator A and the accumulator B respectively, and then a sub routine GET-TRQ is executed whereby the present engine torque is obtained. When there is a downshift, the value is subtracted from the N SHIFT and stored in the accumulator A but when there is an upshift, the value is added to the N SHIFT and stored in the accumulator B. Then a sub routine GET-TH. for obtaining and storing the throttle opening wherein the torque after speed stage change is equal to the present torque in the accumulator B. is executed (ST924) and the program goes forward to the Step ST925. In the Step ST925, when the timer $T-T_4$ is not timed out, the program goes forward to the Step ST906 but when the timer T $T_4$ is timed out the program goes forward to a Step ST926. In Step ST926, when the timer $T-T_5$ is timed out the flag F-TH-HLD is set to "0" and the program goes forward to the Step ST906 but when the timer $T-T_5$ is not timed out the content of the accumulator B. namely the throttle opening being equal to the torque after the speed stage change to the present torque, is stored in memory TH-OUT (ST928). In Step ST929, the throttle opening is controlled to the value in memory TH-OUT. After this the program goes forward to Step ST930. In Steps ST930 through ST935, when the resume switch RS is turned ON. the flag F-A/D-CAN is set to "0" whereby the cancellation of vehicle speed control is released. On the other hand, when the shift position switch SPS is positioned at one of the driving range, the reverse range and the parking range, when the brake switch BS is turned ON or when the parking brake switch PK is turned ON. the flag F-A/D-CAN is st to "1" whereby the vehicle speed control is released. In Step ST936 through ST937, when the present vehicle speed VC is lower than 40 Km/$_n$, the flag F-A/D-CAN is set to "1" and the flag F-A/D-SET is set to "0" whereby the vehicle speed control is cancelled, and then the vehicle speed control is reset.

In the sub routine GET-TH in FIG. 10, the torque value in the accumulator B is memorized in memory TRQ at Step ST1001. The accumulator B is reset to a value of −1 (ST1002). As the operation enters the loop a value of +1 is added to the accumulator B (ST1003). The content of the accumulator B is compared with the maximum throttle opening TH MAX (ST1004). When the content of accumulator B is greater than the TH MAX, the content of the accumulator B is set as the TH MAX. But when the content of accumulator B is smaller than the TH MAX, the content of accumulator B is pushed to a stack at Step ST1005, then a sub routine GET-TRQ for obtaining the torque is executed (ST1006). By this sub routine GET-TRQ, the address (torque) calculated is stored in the accumulator B. In Step ST1007, when the content of accumulator B is greater than that of memory TRQ. the value pushed in the stack is returned to the accumulator B. but when the content of accumulator B is smaller than that of memory TRQ, the value pushed in the stack is returned to the accumulator B, then the program goes forward to Step ST1003. By this way, the throttle opening having the torque equalled to the content of accumulator B in the Step ST1001 is stored in the accumulator B.

Figures 11, 12:
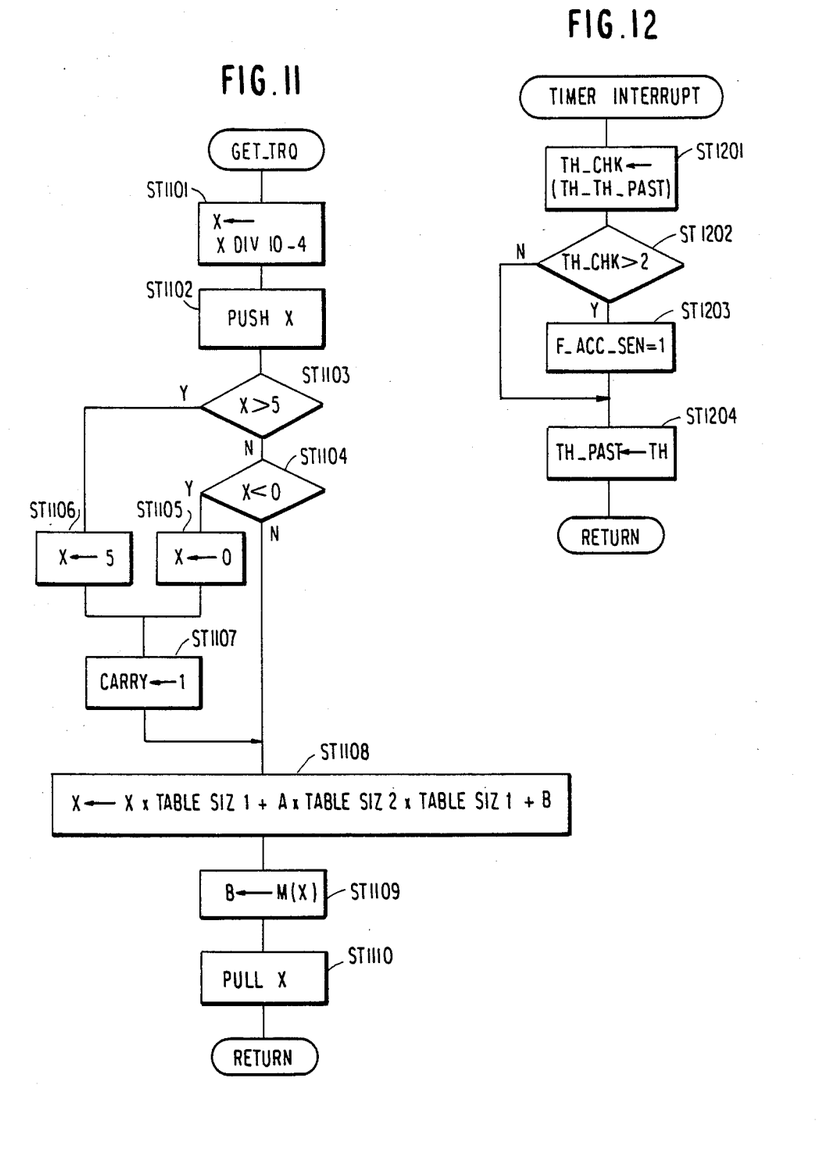
FIG. 11 is a flow chart showing a sub routine GET TRQ of the CPU.
FIG. 12 is a flow chart showing an interrupt routine of the CPU.

In the sub routine GET-TRQ in FIG. 11, the present vehicle speed VC, the speed stage NSHIFT and the throttle opening TH are stored in the index register X, the accumulator A and the accumulator B respectively before this sub routine GET-TRQ is executed. The value in the index register X is divided by 10 and 4 is subtracted therefrom (ex. the value is 1 when VC=40 Km/$_n$) and this value is reentered into the index register X (ST1101). The content of index register X is pushed to the stack (ST1102). When the value in index register X is greater than 5, 5 is entered into the index register X and, on the other hand, when the value in index register X is smaller than 0, 0 is entered into the index register X (ST1105). When the value in index register X is changed, 1 is entered into a memory CARRY (ST1107). By this process, the present vehicle speed VC is divided to six stages from 0 through 5, and is stored in the index register X. By the following formula (address), the address storing the torque in accordance with the present vehicle speed VC, the gear ratio N SHIFT and the throttle opening TH are obtained (ST1108).

Formula (address) = (the value in the index register $X$) ·
TABLE SIZ 1 +
(the value in the accumulator $A$) ·
TABLE SIZ 1 · TABLE SIZ 2 +
(the value in the accumulator $B$)

TABLE SIZ 1 and TABLE SIZ 2 are constants decided in accordance with the storage capacity for torque. The content of the address obtained at Step ST1108 is entered in the accumulator B (ST1109). The value pushed to the stack is returned to the index register X (ST1110).

FIG. 12 shows a sub routine TIMER INTERRUPT for execution every 200 msec. The absolute value of difference between the present throttle value opening TH and the value in memory TH PAST is entered into a memory TH-CHK (ST1201). When the value in memory TH-CHK is greater that 2, the flag ACC-SEN is set to "1" (ST1201, ST1203). The present throttle opening TH is entered into the memory TH-PAST (ST1204). In this way, when the throttle opening TH is changed over 3 within 200 msec. the flag ACC-SEN is set to "1" whereby rapid throttle opening change is detected.

What is claimed is:

1. A vehicle speed control system for a motor vehicle having an internal combustion engine with a throttle, an automatic transmission and an automatic transmission control system, comprising:

vehicle speed detecting means for generating a signal in accordance with a detected vehicle speed;

a vehicle speed memory for memorizing said detected vehicle speed;

set switch means for commanding memorization of a desired vehicle speed to said vehicle speed memory;

throttle valve driving means operatively coupled to a throttle valve, for maintaining said detected vehicle speed at said memorized desired vehicle speed;

throttle valve drive selecting for selectively actuating said throttle valve driving means;

said transmission having a plurality of gear ratios;

means for storing first and second reference data representing an intended gear ratio of said transmission in accordance with said vehicle speed and a throttle opening;

reference data selecting means for selecting said first reference data at a time when said throttle valve driving means is not actuated, and for selecting said second reference data at a time when said throttle valve driving means is actuated; and gear ratio changing means for changing the gear ratio of said transmission to said intended gear ratio in accordance with reference data selected by said reference data selecting means, said first and second reference data being such that said gear ratio changing means changes the gear ratio of said transmission more often when said reference data selecting means selects the first reference data than when said reference data selecting means selects the second reference data.

2. The vehicle speed control system according to claim 1, wherein said throttle valve drive selecting means has release means for cancelling the operation of said throttle valve driving means, for driving said throttle valve according to the operation of said set switch means, and for stopping the driving of said throttle valve driving means according to said release means.

3. The vehicle speed control system according to claim 1, wherein said reference data selecting means prohibits a change between said first and second reference data when said gear ratio changing means is changing the gear ratio of said transmission.

4. The vehicle speed control system according to claim 1, further comprising an accelerator pedal, and wherein said reference data selecting means selects said first reference data when said accelerator pedal is depressed at a time when said second reference data is selected.

5. The vehicle speed control system according to claim 1, wherein said first and second reference data each includes data representing a shift diagram for deciding the gear ratio according to said vehicle speed and said throttle opening, and said shift diagram of said second reference data has a larger hysteresis than that of said first reference data.

6. The vehicle speed control system according to claim 1, further comprising: a lockup clutch and lockup controlling means for controlling said lockup clutch according to said selected reference data by said reference data selecting means, wherein said first and second reference data each includes data representing a lockup diagram for deciding a state of the lockup clutch according to said vehicle speed and said throttle opening, and wherein said first and second reference data being such that said lockup controlling means changes a setting of said lockup clutch more often when said reference data selecting means selects the first reference data than when said reference data selecting means selects the second reference data.

7. The vehicle speed control system according to claim 6, wherein said lockup diagram of said second reference data has a larger hysteresis than that of said first reference data.

8. A vehicle speed control system for a motor vehicle having an internal combustion engine with a throttle, an automatic transmission and an automatic transmission control system, comprising:
   vehicle speed detecting means for generating a signal in accordance with a detected vehicle speed;
   a vehicle speed memory for memorizing said detected vehicle speed;
   set switch means for commanding memorization of a desired vehicle speed to said vehicle speed memory;
   throttle valve driving means, operatively coupled to a throttle valve, for maintaining said vehicle speed at said desired memorized vehicle speed;
   throttle valve drive selecting means for selectively actuating said throttle valve driving means;
   said transmission having a plurality of gear ratios;
   means for storing reference data representing an intended gear ratio in accordance with said detected vehicle speed and a throttle opening;
   reference data selecting means for selecting reference data in accordance with said detected vehicle speed and throttle opening;
   gear ratio changing means for changing the gear ratio of said transmission to said intended gear ratio in accordance with the reference data selected by said reference data selecting means;
   timer means for causing said gear ratio changing means to change the gear ratio of said transmission to said intended gear ratio during a preset time, the preset time being selected in accordance with a deviation between said memorized desired vehicle speed and a detected vehicle speed, and said timer means being actuated during a time that said throttle valve driving means is actuated.

9. A vehicle speed control system for a motor vehicle having an internal combustion engine with a throttle, an automatic transmission and an automatic transmission control system, comprising:
   vehicle speed detecting means for generating a signal in accordance with a detected vehicle speed;
   a vehicle speed memory for memorizing said detected vehicle speed;
   set switch means for commanding memorization of a desired vehicle speed to said vehicle speed memory;
   throttle valve driving means, operatively coupled to a throttle valve, for maintaining said vehicle speed at said memorized desired vehicle speed;
   throttle valve drive selecting means for selectively actuating said throttle valve driving means;
   said transmission having a plurality of gear ratios;
   means for storing reference data representing an intended gear ratio in accordance with said detected vehicle speed and a throttle opening;
   reference data selecting means for selecting reference data in accordance with said detected vehicle speed and a throttle opening;
   gear ratio changing means for changing the gear ratio of said transmission to said intended gear ratio in accordance with reference data selected by said reference data selecting means; and
   timer means for inhibiting an upshift of said transmission to said intended gear ratio during a preset time after a downshift of said transmission, said timer means being actuated during a time when said throttle valve driving means being actuated.

10. A vehicle speed control system for a motor vehicle having an internal combustion engine with a throttle, an automatic transmission and an automatic transmission control system, comprising:
    vehicle speed detecting means for generating a signal in accordance with a detected vehicle speed;
    a vehicle speed memory for memorizing said detecting vehicle speed;
    set switch means for commanding memorization of a desired vehicle speed to said vehicle speed memory;
    throttle valve driving means, operatively coupled to a throttle valve, for maintaining said vehicle speed at said memorized desired vehicle speed;
    throttle valve drive selecting means for selectively actuating said throttle valve driving means;
    said transmission having a plurality of gear ratios;
    means for storing reference data representing an intended gear ratio in accordance with said detected vehicle speed and a throttle opening;
    reference data selecting means for selecting reference data in accordance with said detected vehicle speed and a throttle opening;
    gear ratio changing means for changing the gear ratio of said transmission to said intended gear ratio in accordance with reference data selected by said reference data selecting means; and
    timer means for delaying an upshift of said transmission to said intended gear ratio during a preset time after a determination of an upshift, said timer means being actuated during a time when said throttle valve driving means actuated.

11. A vehicle speed control system for a motor vehicle having an internal combustion engine with a throttle, an automatic transmission and an automatic transmission control system, comprising:
    vehicle speed detecting means for generating a signal in accordance with a detected vehicle speed;
    a vehicle speed memory for memorizing said detected vehicle speed;

set switch means for commanding memorization of a desired vehicle speed to said detected vehicle speed memory;

throttle valve driving means, operatively coupled to a throttle valve, for maintaining said detected vehicle speed at said memorized desired vehicle speed;

throttle valve drive selecting means for selectively actuating said throttle valve driving means;

said transmission having a plurality of gear ratios;

means for storing reference data representing an intended gear ratio and a lockup state of said transmission in accordance with said detected vehicle speed and a throttle opening;

gear ratio changing means for changing the gear ratio of said transmission to said intended gear ratio represented by said reference data;

lockup clutch control means for controlling a lockup clutch in accordance with said lockup state set by said reference data; and lockup inhibiting means for controlling said lockup clutch control means so as to inhibit said lockup clutch when a deviation between said memorized desired vehicle speed and a detected vehicle speed is larger than a preset value, said lockup inhibiting means being actuated at a time when said throttle valve driving means is actuated.

12. The vehicle speed control system according to claim 11, wherein said lockup inhibiting means permits engagement of said lockup clutch when a deviation between said memorized desired speed and a detected vehicle speed is smaller than a preset value after a lockup is inhibited.

13. The vehicle speed control system according to claim 12, wherein said lockup inhibiting means includes timer means for inhibiting said lockup clutch during a preset time after the lockup is inhibited.

* * * * *